March 22, 1938.
L. LENG
2,111,595
CONTROL ARRANGEMENT FOR ENERGY LEADS
Filed July 21, 1934
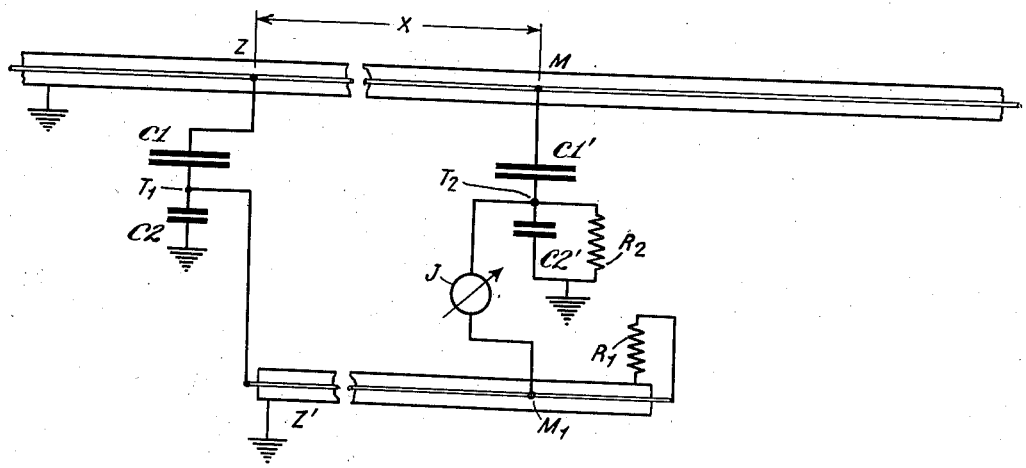
INVENTOR
LEOPOLD LENG
BY
ATTORNEY Patented Mar. 22, 1938

2,111,595

UNITED STATES PATENT OFFICE 2,111,595

CONTROL ARRANGEMENT FOR ENERGY LEADS

Leopold Leng, Berlin, Germany, assignor to Telefunken Gesellschaft für Drahtlose Telegraphie m. b. H., Berlin, Germany, a corporation of Germany Application July 21, 1934, Serial No. 736,323
In Germany August 26, 1933

9 Claims. (Cl. 178—44)

On certain energy feed lines or antenna leads for conducting radio frequency energy, it is frequently desired that there be only travelling or non-stationary waves. In such cases whenever standing waves are produced, it is an indication of the presence of defects in the associated part of the circuit including the lead, or wrong impedance matching, or defects of the connected apparatus. It is now proposed to provide a control device designed to indicate the presence of standing waves, for causing an alarm.

According to this invention, there is employed in addition to the main antenna feed lead another antenna lead acting as a comparison or reference lead of a certain length which is coupled at a suitable location with respect to the main antenna lead to be checked up. The end of the comparison lead is connected to the circuit by means of a resistance equal to the surge impedance thereof. If there are only traveling waves on the main antenna lead, then the relationship between the electrical condition at a point on the main antenna feed line and the condition at a like distance on the comparison or reference lead will be independent of the distance. The comparison or reference lead providing a reliable and efficient means to obtain a small fluctuation in the line voltage when there is present in the energy feed line stationary or standing waves. The indication of standing waves is accomplished by means of a bridge-like circuit wherein no current flows when the energy feed line of the comparison or reference leads is in perfect balance. The balance of the bridge is upset only when there is present in the energy feed line standing waves. The current caused by the standing waves upsetting the balance of the bridge-like circuit causes an indication in a suitable indicating device such as a galvanometer. Any trace of a standing wave on the main line or lead manifests itself by a change in these conditions, excepting the points which are a whole multiple of a half wave length apart from the coupling point.

The single drawing accompanying this specification is a schematic diagram showing a measuring device predicated upon this idea. The comparison lead having a characteristic impedance $Z'$ terminates at its far end in a resistance $R_1$ whose value is equal to $Z'$. At the beginning it is capacitively coupled by means of a voltage divider scheme comprising two condensers $C1$ and $C2$ connected in series between the main lead and ground, the antenna or main lead having a wave or surge impedance $Z$. At a certain distance $x$ (in the presence of dissimilar rates of propagation upon the main and the comparison lines, the electrical length should be made alike) are located the measuring points $M$ and $M'$. Connected to the former is a second voltage divider comprising condensers $C1'$ and $C2'$ of the same kind as the one located at the beginning of the measuring line. The condenser $C2'$ is shunted with a resistance $R_2$ whose value is equal to $Z'$, in other words, equal to the surge impedance of the comparison lead, so that the voltage divider step-down at junction point $T_2$ agrees with that at the junction point $T_1$ in amplitude and in phase. The potential at $T_1$ is equal to theta at $Z$. Theta is a complex quantity because the lower condenser is shunted by the characteristic resistance $Z'$ of the comparison or reference lead. In order that the potential at $T_2$ should be theta times the potential at $M$ we must therefore duplicate the first potential dividing system by shunting the lower condenser with a resistance $Z'$. In the foregoing, it is assumed that the meter $J$ is disconnected. The high frequency indicating instrument $J$ which is interposed between the points $M_1$ and $T_2$, as will thus be seen, will not show any deflection as long as the energy propagation conditions are undisturbed on the main lead. But, if the latter is faultily adapted, with the ohm error of adaptation represented by the value of $D$ in ohms, and the inductive or capacitive adaptation defect represented by the value of $X$ in ohms, the indication or reading of the instrument will be approximately for relatively small errors proportional to the following expression:

$$P \sin bx \frac{\sqrt{D^2+X^2}}{Z}$$

where $P$ is the potential at the beginning of the main line $$b=\frac{2\pi}{\lambda}$$

In other words, the reading of the instrument is approximately proportional to the defective adaptation.

The scheme is similarly applicable to symmetric antenna feed leads.

Instead of the instrument, there could be used a relay in the circuit designed to occasion automatic release or tripping or the connection of an alarm device upon the inception of or in the presence of defects.

What is claimed is:

1. A check-up device for radio frequency energy, feed leads for currents having travelling and occasional abnormal standing waves which are reflected from the terminal end of said energy feed leads, said device comprising a comparison lead loosely coupled to said radio frequency energy feed lead at the beginning thereof, a measuring point removed from said first mentioned coupling point in the direction of wave propagation, a second coupling from the last mentioned measuring point coupled to a measuring point on said comparison lead, the distance between said points being equal in electrical distance to that of the energy feed lead, a resistance connected to the end of said comparison lead, a voltage divider interposed between the two coupling points of said energy feed line and said reference lead, a resistance equal to the surge impedance of the resistance which is connected to the end of said comparison lead, an indicator in the circuit with one of said connections, said indicator being adapted to operate in response to the abnormal standing wave circuit condition of the current in said energy feed lead.

2. A checkup device according to claim 1 with the characteristic feature that the indicator is adapted to determine changes of the circuit amplitude condition in the energy feed lead, said indicator comprising a radio frequency measuring instrument combined with said voltage divider, one pole of said radio frequency measuring instrument being united with the measuring point on the comparison lead and the other pole being united at a junction point on the voltage divider which is connected to the energy feed lead.

3. A checkup device according to claim 1 with the characteristic feature that the indicator is adapted to determine changes of the circuit phase condition in the energy feed lead, said indicator comprising a radio frequency measuring instrument combined with said voltage divider, one pole of said radio frequency measuring instrument being united with the measuring point on the comparison lead and the other pole being united at a junction point on the voltage divider which is connected to the energy feed lead.

4. A check-up device according to claim 1 with the characteristic feature that the voltage divider has a ratio agreeing both in amplitude and phase with the voltage division prevailing at the coupling point of said energy feed line.

5. A check-up device according to claim 1 with the characteristic feature that the voltage divider has its measuring point on said energy feed line located at the same coupling point as the coupling point of said reference lead, said reference lead having a lead for connecting its far end with a resistance whose value is equal to the surge impedance of the energy feed line.

6. In combination, an energy feed lead carrying radio frequency current in the form of traveling waves and occasional abnormal standing waves, another lead running parallel with said energy lead and terminating in a resistance, two connections from separate points on said energy lead to similar separated points on said other lead, each of said connections coupled together by means of a voltage divider, a resistance for said other lead connected at a junction point on said voltage divider, said resistance being equal to the surge impedance of the other lead running parallel to said energy lead, and an indicator connected in series with the junction point of said voltage divider and one of said connections, said indicator being adapted to operate in response to the abnormal standing wave condition of the current in said energy lead.

7. In combination, an energy feed lead carrying radio frequency current in the form of traveling waves and occasional standing waves, another lead running parallel with said energy lead and terminating in a resistance, two connections from separate points on said energy lead to similar separated points on said other lead, each of said connections coupled together by capacitive means of a voltage divider, a resistance for said other lead connected at a junction point on said voltage divider, said resistance being equal to the surge impedance of the other lead running parallel to said energy lead, and an indicator connected in series with the junction point of said voltage divider and one of said connections, said indicator being adapted to operate in response to the abnormal standing wave condition of the current in said energy lead.

8. In combination an energy feed lead carrying radio frequency current in the form of traveling waves and occasional abnormal standing waves, another lead running parallel with said energy lead and terminating in a resistance, two connections from separate points on said energy lead to similar separated points on said other lead, each of said connections coupled together by capacitive means of a voltage divider, a resistance for said other lead connected at a junction point on said voltage divider, said resistance being equal to the surge impedance of the other lead running parallel to said energy lead, and a relay connected in series with the junction point of said voltage divider and one of said connections, said relay being adapted to operate in response to the abnormal standing wave condition of the current in said energy lead.

9. A control device for radio frequency energy comprising a high frequency energy feed line, a comparison line coupled to said energy feed line by a first and second voltage divider, each voltage divider comprising two condensers connected in series between different points on said energy feed line and ground, a junction point between said condensers and a connection between said junction points of said first voltage divider and one end of said comparison line, the other end of said comparison line terminating in a resistance, the junction point on said second voltage divider connected with a resistance in series with ground, a radio frequency indicating instrument connected in series between the junction point of the second voltage divider and said comparison line to indicate the abnormal standing wave circuit condition of the current in said energy feed lead.

LEOPOLD LENG.